Dec. 9, 1969 W. HERMES 3,483,334

COMMUNICATION SYSTEM WITH GAIN CONTROLLED INTERMEDIATE REPEATER STATIONS

Filed Sept. 13, 1965

INVENTOR
WILLEM HERMES

BY [signature]

AGENT

United States Patent Office 3,483,334
Patented Dec. 9, 1969

3,483,334

COMMUNICATION SYSTEM WITH GAIN CONTROLLED INTERMEDIATE REPEATER STATIONS

Willem Hermes, Hilversum, Netherlands, assignor, by mesne assignments, to U.S. Philips Corporation, New York, N.Y., a corporation of Delaware Filed Sept. 13, 1965, Ser. No. 486,770
Claims priority, application Netherlands, Sept. 16, 1964, 6410756
Int. Cl. H04b 3/38, 3/58
U.S. Cl. 179—170 4 Claims

ABSTRACT OF THE DISCLOSURE

A dual line signal transmission system with intermediate repeater stations in which the gain of the terminal repeater station is controlled by the amplitude of a pilot signal transversing the line from the transmitting end. The gain of the intermediate repeaters is controlled by a frequency modulated signal which is supplied to the return transmission line and the frequency of which is established by the amplitude of the pilot signal at the above mentioned terminal repeater. Each transmission line serves as the carrier for the F.M. gain control signal for the other line.

This invention relates to communication systems having two transmission systems for the transmission of signals through two parallel transmission lines in each of which the signals are transmittted through at least one repeater station to a final station. For level control in each transmission system by means of a co-transmitted pilot signal a pilot receiver is connected to each final station which pilot receiver controls an adjustable lever-control impedance in a final station. Through a level control line, an adjustable level-control impedance in at least one of the repeater stations which precede the final station, each pilot receiver is connected through a frequency modulator provided with a memory, more particularly a regulating motor, to the level control line for the transmission through the level control line of the frequency-modulated level control signal which is applied through a frequency detector to the adjustable level-control impedance in the repeater station. The transmission systems of the communication system may be designed more particularly for the signal transmission in the forward and return directions.

A communication system of the kind referred to has already been described in a prior patent application of William Hermes et al., Ser. No. 431,642, filed Feb. 10, 1965.

An object of the invention is to provide a very advantageous communication system of the described kind in which, together with simplicity in equipment, the reliability of operation is increased.

The communication system according to the invention is characterized in that in each transmission system the frequency-modulated level control signals from both transmission systems are simultaneously applied to the input circuit of each frqeuency detector serving for level control in a repeater station, because the input circuit of the frequency detector of the relevant transmission system is coupled, on the one hand, to the transmission line of the other transmission system, which constitutes the level control line of the relevant transmission system, and, on the other hand, through the intermediary of an attenuator to the relevant transmission line, which constitutes the level control line for the other transmission system.

In order that the invention may be readily carried into effect, it will now be described in detail, by way of example, with reference to the accompanying diagrammatic drawing, in which.

Figure 1:
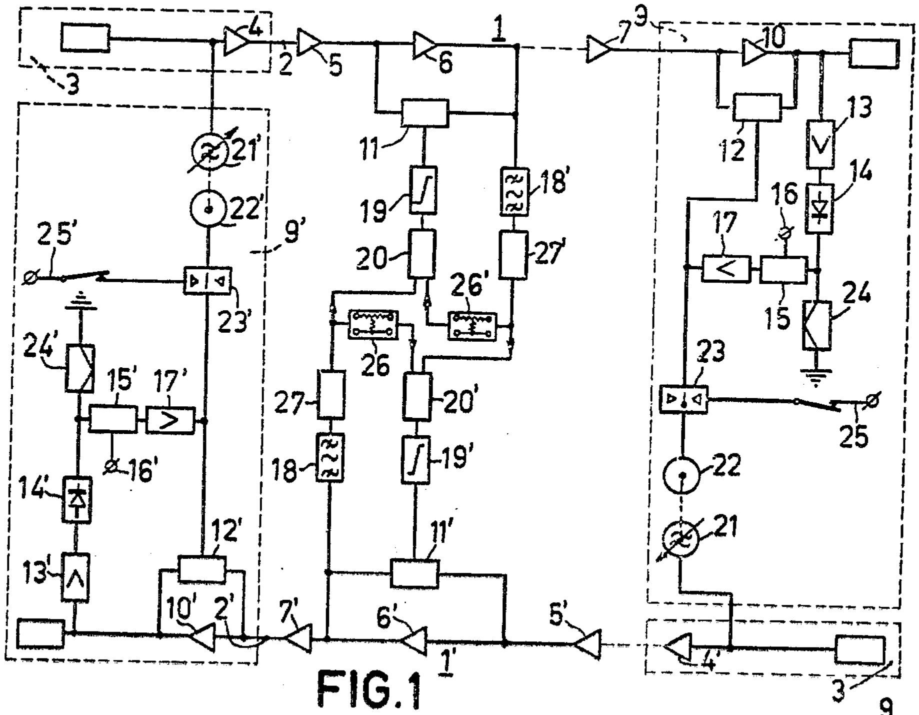
FIGURE 1 shows a communication system according to the invention.

FIGURE 1 shows a transistorized carrier telephone system according to the invention having two transmission systems 1, 1' for the signal transmission in the forward and return directions along co-axial lines 2, 2' within a transmission cable, for example 960 speech signals in a frequency band from 60 kc./s. to 4 mc./s., a television signal or the like being transmitted through each of the co-axial lines 2, 2'.

The transmission systems 1, 1' for the forward and return directions are identical in structures so that it is sufficient to described the transmission system 1 for the forward direction. Corresponding elements of the transmission system 1' are indicated by the same reference numerals but provided with an index.

In the transmission system 1 the carrier telephone signals originating from a first station 3 and an associated first repeater station 4 are applied through intermediate repeater stations 5, 6, 7 to a final station 9 and an associated final repeater station 10. The powering of the intermediate repeater stations 5, 6, 7, which is not shown, is effected in known manner by means of a direct supply voltage which is applied, for example, from the first station 3, together with the carrier telephone signals to the co-axial line 2.

To compensate for level variations in the transmitted signals which are caused substantially by damping variations in the co-axial line 2 resulting from temperature variations, the intermediate repeater station 6 and the final repeater station 10 include adjustable level-control impedances 11 and 12 respectively which are formed by temperature-dependent resistors, for example, in the form of thermistors or small glow-lamps, included in negative feedback circuits of the repeater stations 6 and 10 respectively, a control current serving for level control being supplied as a heating current to the filament of the relevant glow-lamp. The intermediate repeater stations 5 and 7 have no level control devices.

For the level control of the repeater stations, 6 and 10 a pilot signal is transmitted together with the carrier telephone signals along the co-axial line and applied to a pilot receiver connected to the final station 9. In its practical embodiment the pilot receiver is constituted by the cascade circuit of a selective pilot amplifier 13 tuned to the pilot frequency, followed by a rectifying device 14 and an amplitude comparison device 15 for comparing the amplitude of the output voltage from the rectifying device 14 with a constant reference voltage originating from a terminal 16, the output voltage of the amplitude comparison device 14 being applied for further handling to an output amplifier 17.

The level control of the complete transmission system is effected from the pilot receiver. In fact, for the level control in the final repeater station 10, the output signal from the output amplifier 17 of the pilot receiver is applied directly to the adjustable level-control impedance 12 of the final repeater station 10, whilst for the level control of the repeater station 6 which precedes the final repeater station 10, the output signal from the output amplifier 17 of the pilot receiver controls a frequency modulator to be described hereinafter for producing a frequency-modulated level control signal which is applied through a level control line to the repeater station 6 and, after frequency selection in a selecting filter 18 and frequency detection in a frequency detector 19 and an associated limiter 20, is applied to the adjustable level-control impedance 11 of the repeater station 6. Without using a separate level control line, the frequency-modulated level control signal, which is located, for example, in the band from 35 kc./s. to 42 kc./s., is applied to the repeater station 6 by using therefor the co-axial line 2' of the other transmission system 1', that is to say the co-axial line 2' of the transmission system 1' also constitutes the level control line of the transmission system 17. Conversely, the co-axial line 2 of the transmission system 1 constitutes the level control line of the transmission system 1'.

In the embodiment described, in order to produce the frequency-modulated level control signal, a frequency modulator is used including a memory in the form of a regulating motor 22 which is coupled to an adjustable frequency-determining element of an oscillator 21 and which has a control circuit 23 constituted by maximum and minimum relays, which is controlled by the output signal from the output amplifier 17 of the pilot receiver. For example, if the output level of the output amplifier 17 exceeds a determined limiting value, the maximum relay responds and the regulating motor 22 rotates in one direction, whereas if the output level of the output amplifier 17 decreases below a determined limiting value the minimum relay responds and the regulating motor 22 rotates in the other direction. It is advantageous for the level control of the repeater station 6 to use a frequency modulator including a memory because, if in the described arrangement an interference occurs in the pilot signal, the supply circuit 25 for the regulating motor 22 may be interrupted by means of a guard circuit 24 connected to the pilot receiver, which has, for example, the form of a relay circuit connected to the rectifier 14 of the pilot receiver. The regulating motor 22 thus remains in the position last occupied and causes no variation in the control impedance 11 in the repeater station 6 so that in case of an interference in the pilot signal the level control system is prevented from being actuated by the spurious signal.

The operation of the arrangement so far described will now be explained in detail.

If a level variation between the maximum and minimum response levels of the control circuit 23 occurs at the output of the output amplifier 17, the regulating motor 22 will remain at rest and only the value of the control impedance 12 in the negative feedback circuit of the final repeater station 10 will be varied with a consequent variation in the amplification of the final repeater station 10 which counteracts the relevant level variation of the pilot signal. However, if the level variation at the output of the output amplifier 17 exceeds the maximum response level or decrease below the minimum response level of the control circuit 23 for the regulating motor 22, then an amplification variation which counteracts the level variation of the pilot signal will also occur by control of the adjustable control impedance 11 due to the frequency variation in the level control signal in the repeater station 6, caused by the regulating motor 22. More particularly it is preferable to carry out the level control in the manner as explained in detail in the aforementioned patent application. The fact that, by using the regulating motor 22, the speed of control in the repeater station 6 is made considerably lower than the speed of control in the final repeater station 10, for example, lower by a factor of 100, results in that the level variation in the repeater station 6 caused by a level control can be followed in the final station 9, so that the pilot signal variation in the final repeater station 10 can be maintained constant below 0.1 db.

In the transmission system described a very advantageous and exact level control is thus obtained, but the communication system so far described involves the difficulty that in case of a serious defect, for example, if the transmission system 1 drops out, the transmission system 1' also drops out since the transmission line 2' of transmission system 1' constitutes the level control line of the transmission system 1.

With simplicity in equipment the above-mentioned difficulty may be obviated, and hence the reliability of operation improved, in that in each of the transmission systems 1, 1' the frequency-modulated level control signals from both transmission systems 1, 1' are simultaneously applied to the input circuit of each of the frequency detectors 19, 19' serving for level control in repeater stations by coupling the input circuits of the frequency detectors 19, 19', on the one hand, to the coaxial lines 2 and 2' respectively of the other transmission systems 1 and 1' respectively, which constitute the level control lines of the relevant transmission systems and, on the other hand, with the interposition of attenuators 26' and 26 respectively to the relevant transmission lines 1 and 1' respectively, which constitute the level control lines of the other transmission systems 1' and 1 respectively. In the described embodiment frequency-modulated level control signals selected by the selecting filters 18, 18', before being applied to the frequency detectors 19, 19' and the associated limiters 20, 20', are brought to a constant level by means of limiters 27, 27', whilst the attenuators 26, 26' employed have a degree of attenuation of, for example, from 6 to 10 db.

In the normal operating condition the relevant frequency-modulated level control signal and the attenuated frequency-modulated level control signal of the other transmission system both occur simultaneously at the input of each of the limiters 20 and 20' respectively associated with the frequency detectors 19 and 19' respectively. The signals are limited to constant level in the limiters 20, 20' and provide by frequency detection in the frequency detectors 19, 19', the heating current serving for level control, of the control impedances 11, 11' of the repeater stations 6, 6'. As is well known when two frequency modulated signals of different amplitudes are applied to a limiter-frequency sensitive detector system, the system responds only to the signal of greater amplitude. Accordingly, when both a level control signal from the transmission line 1' and an attenuated level control signal from the transmission line 1 are applied to the limiter 20, the detector 19 responds to the stronger signal from line 1'. Similarly, detector 19' responds to the level control signal from transmission line 1 notwithstanding the presence of the attenuated signal from line 1' also supplied to the limiter 20'.

Thus, in the normal operating condition, an excellent level control is obtained and, as will be explained in detail hereinafter, if the transmission system 1', for example, drops out due to an interruption at the repeater station 5', the other transmission system 1 will keep operating excellently.

In this case, the frequency-modulated level control signal will no longer be transmitted through the co-axial line 1' from the interruption at the repeater station 5' and the pilot signal flowing in the line 1' will also be interrupted so that the associated regulating motor 22' is stopped and a level control signal flows in the co-axial line 1 having a frequency which is determined substantially by the damping of the co-axial line 1' at the moment of interruption. The frequency detector 19 of the repeater station 6 of the transmission system 1 has now no longer a level control signal applied to it through the co-axial line 1' but the level control signal in the co-axial line 1 which now brings about the level control in the repeater station 6 through attenuator 26', limiter 20 and frequency detector 19. The fact that the dampings in the co-axial lines 1 1' are substantially the same and hence also the frequencies of the two frequency-modulated level control signals at the instant preceding the interruption results in excellent level control being maintained at least temporarily, for example, for several days, even after the interruption in the operation of the transmission system 1'.

In order to ensure that, in case of a serious defect in one of the transmission systems 1, 1', undesired signals which normally have a comparatively small amplitude are prevented from being applied through the associated lines 2, 2' to the frequency detectors 19, 19', the lines leading to the frequency detectors 19 and 19' respectively include threshold devices, having, for example, a threshold level of —20 db. In the embodiment described the limiters 27, 27' are at the same time designed as threshold devices and more particularly formed as bistable triggers.

The reliability of operation of the communication system is thus improved, while retaining simplicity in equipment, by elegantly utilizing the properties of frequency modulation.

In this connection it is to be noted that the frequency detectors employed may be of different types, for example, of the Foster Seeley type, of the ratio type, or of the frequency-counter type, for example, as described in the Journal ATM, V 3823-1, October 1957, pages 221–222, etc.

Figure 2:
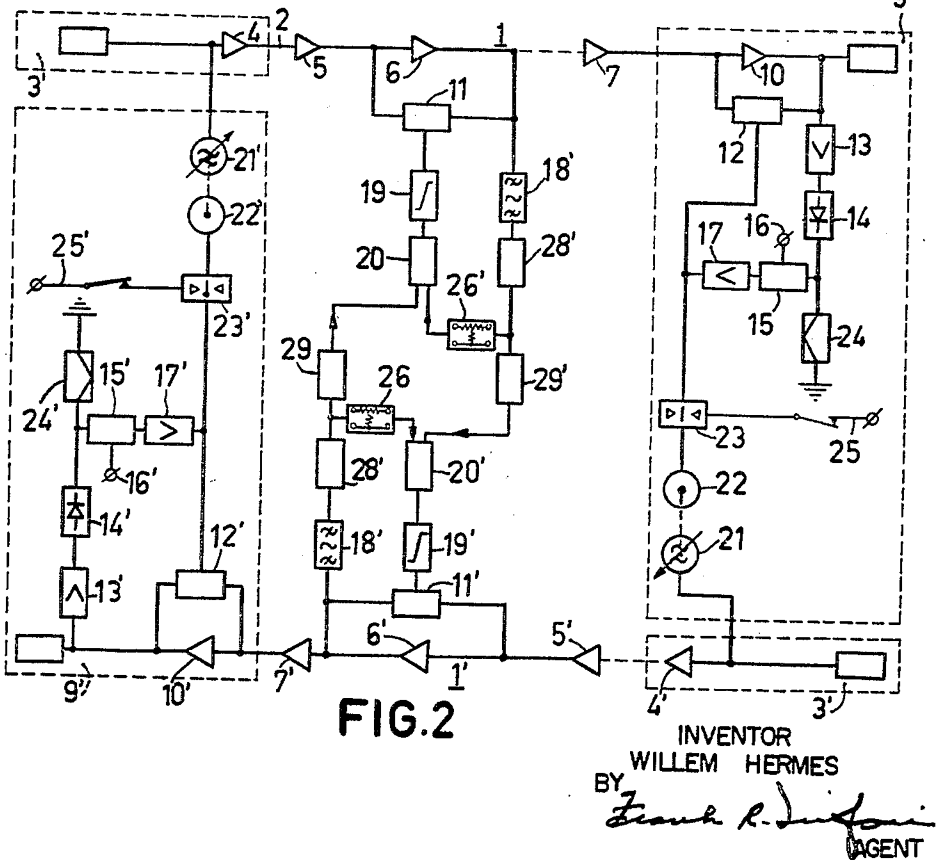
FIGURE 2 shows a variant of the communication system of FIGURE 1.

FIGURE 2 shows a variant of the communication system of FIGURE 1 in which corresponding elements are indicated by the same reference numerals.

The communication system of FIGURE 2 is distinguished by stages 28, 28' following the selecting filters 18, 18' in the repeater stations 6, 6'. More particularly the stages 28, 28' are designed solely as limiters and separate threshold devices 29, 29' are included in the lines without attenuators 26, 26' to the frequency detectors 19, 19'. In fact, in case of a serious defect in one of the transmission systems 1, 1' for suppressing undesirable interference signals it suffices to include threshold devices at these areas.

Similarly, it already suffices to include, instead of the limiters 28, 28', limiters in the lines with the attenuators 26, 27'.

What is claimed is:

1. A communication system comprising a first transmission line having a first originating station, a first terminal station and a first intermediate repeater station, a second transmission line having a second originating station adjacent said first terminal station, a second terminal station adjacent said first originating station and a second repeater station adjacent said first repeater station, means at said first originating station for applying a first pilot signal to said first line, means at first terminal station for producing a first wave having a frequency as determined by the intensity of said first pilot signal at said first terminal station, means for applying said first wave to said second originating station and thereby to said second line, means for coupling said second line and said first repeater station and for applying said first wave to said first repeater station, said first repeater station comprising frequency discriminating means responsive to said first wave for producing a first level control signal having an intensity as determined by the frequency of said first wave and means responsive to said first level control signal for controlling signal amplification at said first repeater station, means at said second originating station for applying a second pilot signal to said second line, means at said second terminal station for producing a second wave having a frequency as determined by the intensity of said second pilot signal at said second terminal station, means for applying said second wave to said first originating station and thereby to said first line, means for coupling said first line and said second repeater station and for applying said second wave to said second repeater station, said second repeater station comprising frequency discriminating means responsive to said second wave for producing a second level control signal having an intensity as determined by the frequency of said second wave and means responsive to said second control signal for controlling signal amplification at said second repeater station, first attenuating means interconnecting said first line and said first frequency discriminating means for applying said second wave to said first discriminating means at an amplitude level less than the amplitude level of said first wave applied to said discriminating means, and second attenuating means interconnecting said second line and said second frequency discriminating means for applying said first wave to said second discriminating means at an amplitude level less than the amplitude level of said second wave.

2. A communication system as claimed in claim 1 wherein said means at said first and second terminal stations for producing said first and second waves respectively each comprise a regulating motor, an oscillator comprising a frequency determining element, means coupling said motor to frequency determining element, and means for deenergizing said motor at levels of said pilot signal greater than a predetermined value.

3. A communication system as claimed in claim 1, wherein each of said frequency discriminating means comprises a signal transmission path having a predetermined threshold conduction level.

4. A communication system as claimed in claim 1 wherein each of said frequency discriminating means comprises a signal level limiter.

References Cited

UNITED STATES PATENTS

| | | |
|---|---|---|
| 2,037,107 | 4/1936 | Abraham. |
| 2,539,426 | 1/1951 | Jacobsen et al. |

KATHLEEN H. CLAFFY, Primary Examiner

J. S. BLACK, Assistant Examiner